(12) United States Patent
Liu

(10) Patent No.: US 8,145,281 B2
(45) Date of Patent: Mar. 27, 2012

(54) PORTABLE ELECTRONIC DEVICE WITH DETACHABLE KEYPAD MODULE

(75) Inventor: Cong Liu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 377 days.

(21) Appl. No.: 12/495,888

(22) Filed: Jul. 1, 2009

(65) Prior Publication Data

US 2010/0137039 A1  Jun. 3, 2010

(30) Foreign Application Priority Data

Nov. 28, 2008 (CN) .......................... 2008 1 0305865

(51) Int. Cl.
*H04M 1/00* (2006.01)
(52) U.S. Cl. ................ 455/575.1; 455/550.1; 455/575.8
(58) Field of Classification Search ............... 455/575.1, 455/550.1, 575.8, 566, 90.3
See application file for complete search history.

(56) References Cited

U.S. PATENT DOCUMENTS

| | | | | |
|---|---|---|---|---|
| 7,069,057 B2 * | 6/2006 | Ishibashi et al. | ............... | 455/566 |
| 7,561,902 B2 * | 7/2009 | Jo | ................ | 455/575.1 |
| 2002/0082042 A1 * | 6/2002 | Mark et al. | ..................... | 455/550 |
| 2003/0078014 A1 * | 4/2003 | Salminen et al. | ............... | 455/90 |
| 2003/0211834 A1 * | 11/2003 | Wu et al. | ...................... | 455/90.3 |
| 2008/0004085 A1 * | 1/2008 | Jung et al. | ...................... | 455/566 |
| 2008/0182631 A1 * | 7/2008 | Otani et al. | ................ | 455/575.1 |
| 2008/0293367 A1 * | 11/2008 | Wulff et al. | ...................... | 455/90.3 |
| 2008/0293457 A1 * | 11/2008 | Chang et al. | ................ | 455/575.1 |
| 2010/0035649 A1 * | 2/2010 | Chen | ............................. | 455/557 |
| 2010/0124951 A1 * | 5/2010 | Cheng | ........................ | 455/575.1 |

* cited by examiner

Primary Examiner — Christian Hannon
(74) Attorney, Agent, or Firm — Altis Law Group, Inc.

(57) ABSTRACT

A portable electronic device includes a first housing, a keypad module, and a decorative bar assembled in the first housing and resisting the keypad module. The first housing includes a first sidewall having a protruding portion; and a second sidewall opposite to the first sidewall, and defining a receiving slot. The keypad module includes a first end defining at least one sliding slot, and a second end opposite to the first end, and having a rib positioned thereon. The protruding portion is slidably latched in the sliding slot, the rib is slidably assembled in the receiving slot.

16 Claims, 4 Drawing Sheets

PORTABLE ELECTRONIC DEVICE WITH DETACHABLE KEYPAD MODULE

BACKGROUND

1. Technical Field

The present disclosure relates to portable electronic devices and, particularly to a portable electronic device having a detachable keypad module.

2. Description of Related Art

Typically, a portable electronic device includes a first housing, a second housing, and a keypad module. The first housing securely attaches to the second housing to define an enclosing space to accommodate electronic components of the portable electronic device. The keypad module is latched inside the enclosing space. However, to replace the keypad module, the housings of the portable electronic device have to be detached/separated. Thus, it is inconvenient and time consuming.

Therefore, there is a room for improvement within the art.

BRIEF DESCRIPTION OF THE DRAWINGS

Many aspects of the portable electronic device with detachable keypad module can be better understood with reference to the following drawings. The components in the drawings are not necessarily to scale, the emphasis instead being placed upon clearly illustrating the principles of the present portable electronic device with detachable keypad module. Moreover, in the drawings, like reference numerals designate corresponding parts throughout the several views.

DETAILED DESCRIPTION

Figure 1:
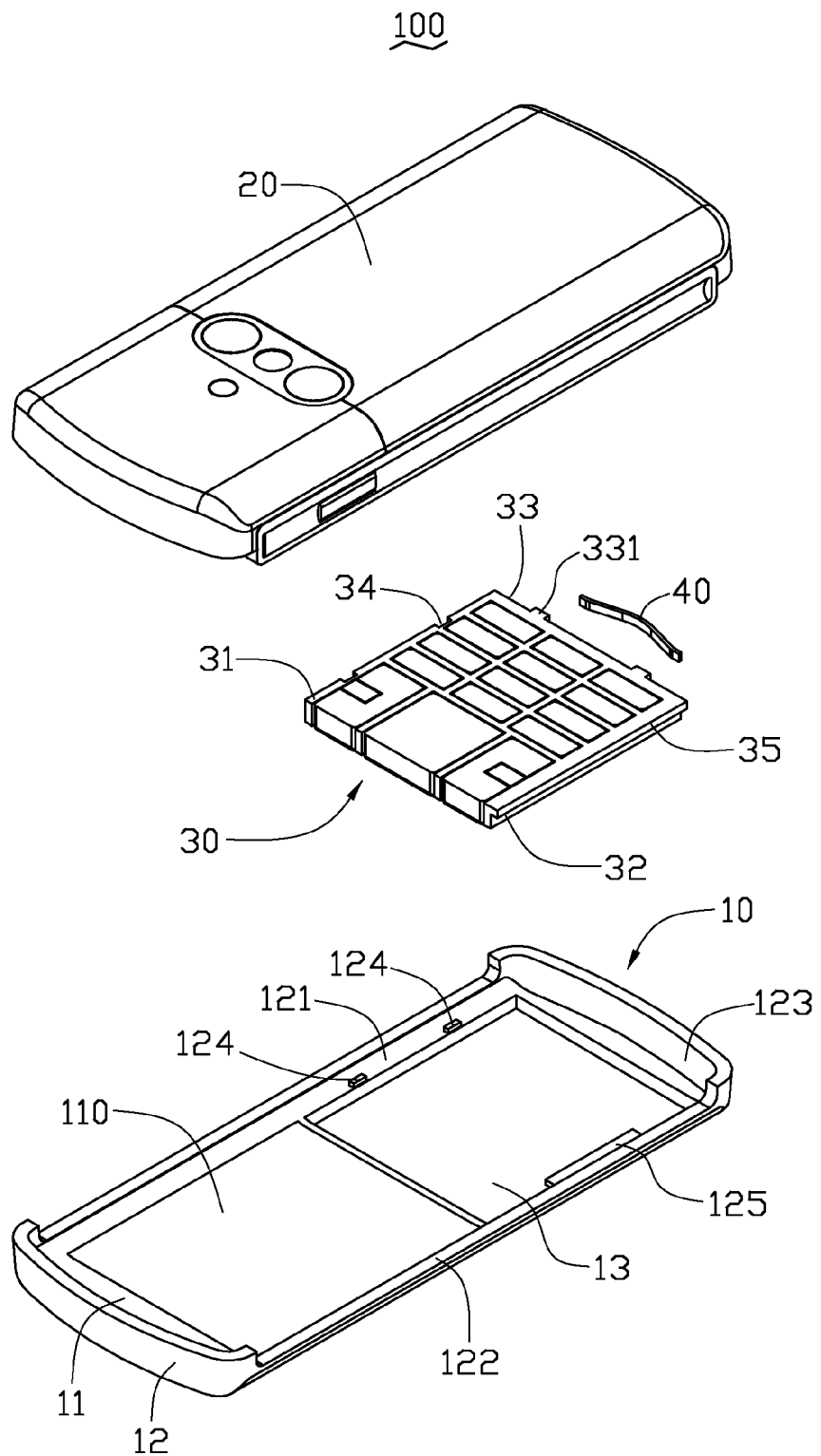
FIG. 1 is an exploded view of a portable electronic device according to an exemplary embodiment.
Figure 2:
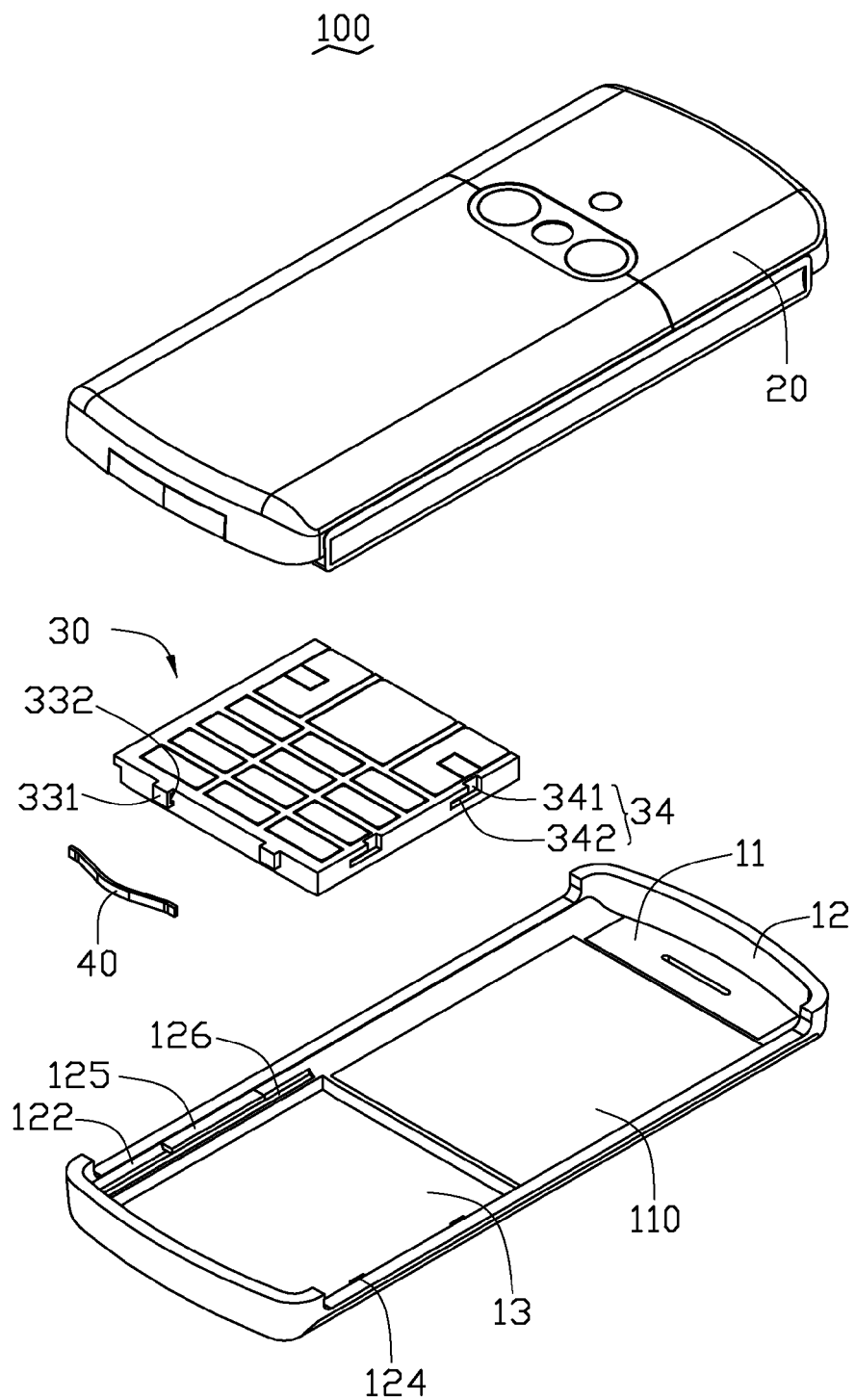
FIG. 2 is similar to FIG. 1, but viewed from another aspect.

FIG. 1 and FIG. 2 show a portable electronic device 100. The portable electronic device 100 includes a first housing 10, a second housing 20 attached to the first housing 10, a keypad module 30 detachably assembled in the first housing 10, and a resilient member 40.

The first housing 10 includes a main housing 11 and four sidewalls 12 substantially perpendicularly bent away from the main housing 11. The main housing 11 defines a window 110 and an accommodating portion 13. The window 110 is configured for displaying a liquid crystal display (LCD). The accommodating portion 13 is defined adjacent to the window 110, and configured for accommodating the keypad module 30. The sidewalls 12 include a first sidewall 121, a second sidewall 122 opposite to the first sidewall 121, and a third sidewall 123 connecting the first sidewall 121 to the second sidewall 122. The first sidewall 121 includes two protruding portions 124 positioned thereon. The second sidewall 122 includes a baffle plate 125 positioned thereon. The baffle plate 125 and the main housing 11 define a receiving slot 126 therebetween.

The keypad module 30 is rectangular. A length of the keypad module 30 is smaller than that of the accommodating portion 13. The keypad module 30 includes a first end 31, a second end 32 opposite to the first end 31, a third end 33 connecting the first end 31 to the second end 32. The first end 31 defines two sliding slots 34 corresponding to the protruding portions 124. Each of the sliding slots 34 is L-shaped, and includes a first slot 341 and a second slot 342 perpendicularly communicating with the first slot 341. The second end 32 includes a rib 35 configured for receiving the receiving slot 126. The third end 33 includes two latching posts 331 positioned thereon. Each of the latching posts 331 defines a fixing hole 332 therein.

The resilient member 40 is a spring or an elastic sheet. In an exemplary embodiment, the resilient member 40 is an elastic sheet. The resilient member 40 is arch-shaped, and includes two ends respectively secured in the fixing hole 332. The resilient member 40 is resists the third sidewall 123, and is configured for providing elastic force to the keypad module 30.

Figure 3:
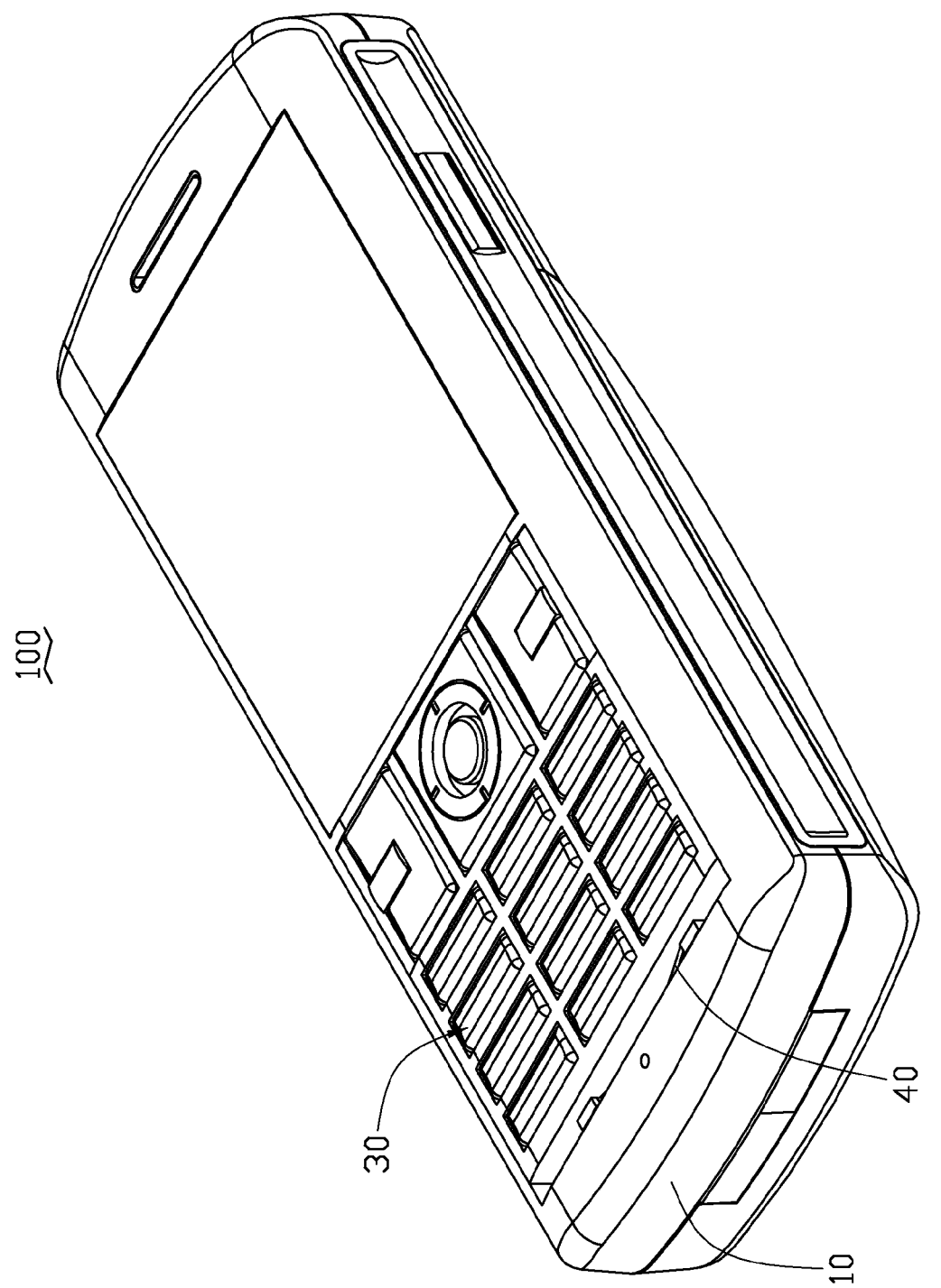
FIG. 3 is an assembled view of the portable electronic device shown in FIG. 1.

Referring to FIG. 3, in assembly, the rib 35 is received in the receiving slot 126. The keypad module 30 is pushed to the third sidewall 123 by an external force, and the resilient member 40 resists the third sidewall 123 and generates an elastic force. The first end 31 is pressed downwardly to receive the protruding portions 124 in each of the first slots 341. The second end 32 resists the baffle plate 125, thereby the keypad module 30 cannot separate from the first housing 10. The keypad module 30 is biased away from the third sidewall 123 by the elastic force of the resilient member 40. The protruding portions 124 slide into each second slot 342.

When the keypad module 30 is to be detached, the keypad module 30 is pushed to the third sidewall 123 by an external force, and the resilient member 40 is compressed. The protruding portions 124 respectively align with each first slot 341. The first end 31 is pressed by an external force and drops off from the first sidewall 121. The rib 35 slides out of each receiving slot 126. Then the keypad module 30 can be detached from the first housing 10.

Figure 4:
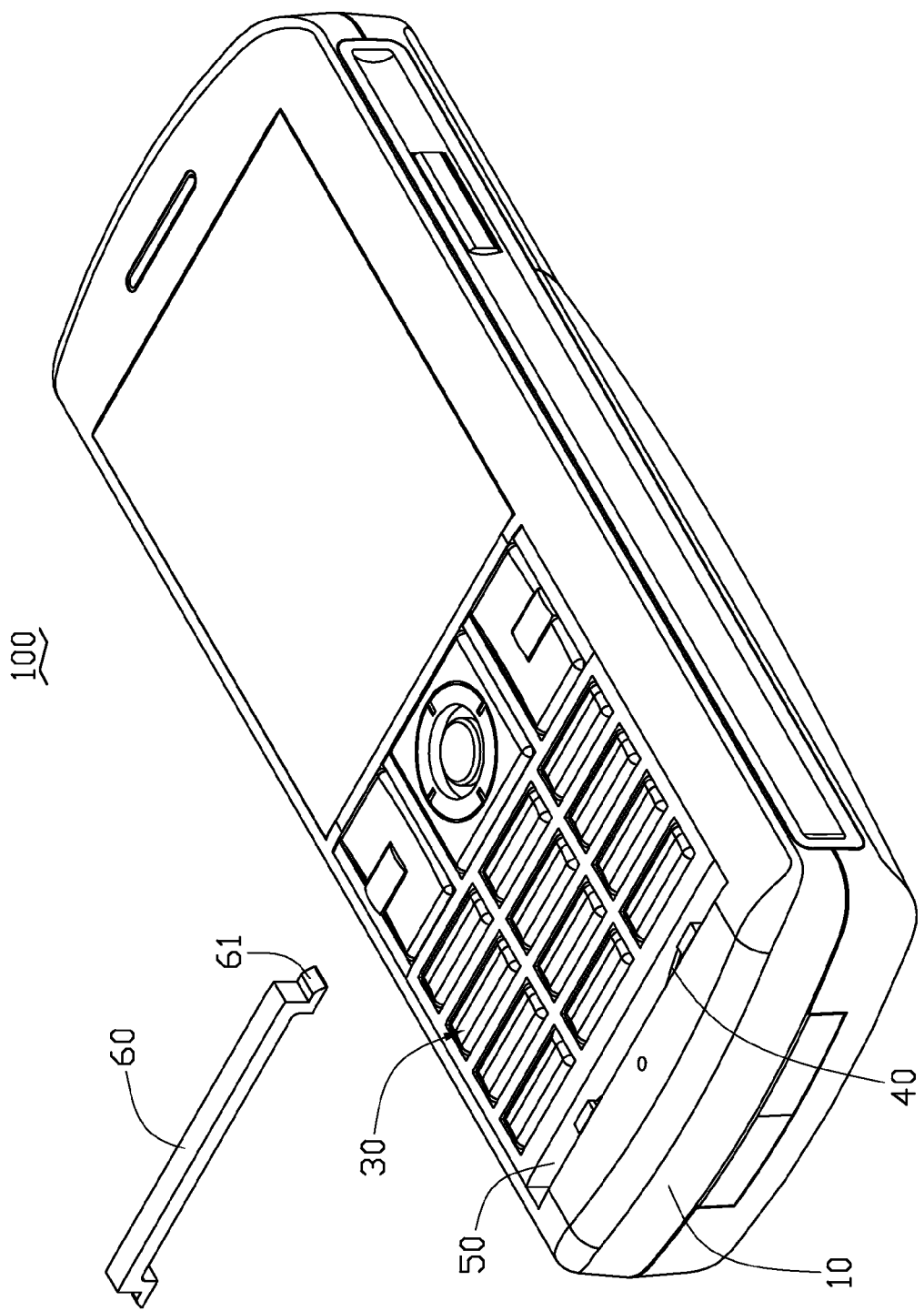
FIG. 4 is similar to FIG. 3 but showing a decorative bar before being assembled to the portable electronic device.

Referring to FIG. 4, the length of the keypad module 30 is smaller than that of the accommodating portion 13, thereby when the keypad module 30 is assembled in the first housing 10, the keypad module 30 and the third sidewall 123 define a gap 50 therebetween. The portable electronic device 100 further includes a decorative bar 60 made of, for example, rubber. The decorative bar 60 includes two clasps 61 positioned at two opposite ends thereof. The clasps 61 latch to the first housing 10 to secure the decorative bar 60 in the gap 50.

It is to be understood, however, that even through numerous characteristics and advantages of the present embodiments have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device, comprising:
a first housing comprising:
a first sidewall having at least one protruding portion;
a second sidewall opposite to the first sidewall, and defining a receiving slot;
a third sidewall connecting the first sidewall to the second sidewall;
a keypad module comprising:
a first end defining at least one sliding slot;
a second end opposite to the first end, and having a rib positioned thereon;
a decorative bar assembled in the first housing and resisting the keypad module; and
a resilient member resisting the third sidewall;

wherein the protruding portion is slidably latched in the sliding slot, the rib is slidably assembled in the receiving slot.

2. The portable electronic device as claimed in claim 1, wherein the keypad module further comprises a third end connecting the first end to the second end, the decorative bar covering the resilient member.

3. The portable electronic device as claimed in claim 2, wherein the sliding slot is L-shaped, and comprises a first slot and a second slot perpendicularly communicating with the first slot.

4. The portable electronic device as claimed in claim 3, wherein the protruding portion is received in the first slot, the resilient member drives the protruding portion to be latched in the second slot.

5. The portable electronic device as claimed in claim 2, wherein the third end defines two latching posts positioned thereon, the resilient member secured on the latching posts.

6. The portable electronic device as claimed in claim 5, wherein the resilient member is an elastic sheet, the elastic sheet is arch-shaped, and includes two ends respectively secured on the latching posts.

7. The portable electronic device as claimed in claim 1, wherein the second sidewall comprises a baffle plate positioned thereon, configured for resisting the keypad module.

8. The portable electronic device as claimed in claim 2, wherein the resilient member is a spring secured on the third end.

9. A portable electronic device comprising:
a first housing comprising:
a first sidewall having at least one protruding portion;
a second sidewall opposite to the first sidewall, and defining a receiving slot;
a third sidewall connecting the first sidewall to the second sidewall;
a keypad module comprising:
a first end defining at least one sliding slot;
a second end opposite to the first end, and having a rib positioned thereon;
a third end connecting the first end to the second end;
a resilient member positioned on the third end, and resisting the third sidewall;
wherein the protruding portion is slidably latched in the sliding slot, the rib is slidably assembled in the receiving slot.

10. The portable electronic device as claimed in claim 9, wherein the portable electronic device further comprises a decorative bar assembled in the first housing and resisting the keypad module.

11. The portable electronic device as claimed in claim 10, wherein the sliding slot is L-shaped, and comprises a first slot and a second slot perpendicularly communicating with the first slot.

12. The portable electronic device as claimed in claim 11, wherein the protruding portion is received in the first slot, the resilient member drives the protruding portion to be latched in the second slot.

13. The portable electronic device as claimed in claim 9, wherein the third end defines two latching posts positioned thereon, the resilient member secured on the latching posts.

14. The portable electronic device as claimed in claim 13, wherein the resilient member is an elastic sheet, the elastic sheet is arch-shaped, and includes two ends respectively secured on the latching posts.

15. The portable electronic device as claimed in claim 9, wherein the second sidewall comprises a baffle plate positioned thereon, configured for resisting the keypad module.

16. The portable electronic device as claimed in claim 9, wherein the resilient member is a spring.

* * * * *